(12) United States Patent
Seiki et al.

(10) Patent No.: US 10,756,355 B2
(45) Date of Patent: Aug. 25, 2020

(54) SYSTEMS AND METHODS FOR RECYCLING FUEL CELL STACK COMPONENTS

(71) Applicant: BLOOM ENERGY CORPORATION, Sunnyvale, CA (US)

(72) Inventors: Elson Seiki, San Francisco, CA (US); Cheng-Yu Lin, Sunnyvale, CA (US); Bijan Moslehi, Mountain View, CA (US); Jakob Hilton, Sunnyvale, CA (US); Drew Paran, Sunnyvale, CA (US); Ali Delkaninia, San Jose, CA (US); Young Bui, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 377 days.

(21) Appl. No.: 15/437,799

(22) Filed: Feb. 21, 2017

(65) Prior Publication Data

US 2017/0244114 A1 Aug. 24, 2017

Related U.S. Application Data

(60) Provisional application No. 62/298,539, filed on Feb. 23, 2016.

(51) Int. Cl.
*H01M 8/00* (2016.01)
*H01M 8/008* (2016.01)

(52) U.S. Cl.
CPC ............ *H01M 8/008* (2013.01); *Y02W 30/86* (2015.05)

(58) Field of Classification Search
CPC ............................. H01M 8/008; Y02W 30/86
See application file for complete search history.

(56) References Cited

U.S. PATENT DOCUMENTS

| 7,713,649 | B2 | 5/2010 | Hickey et al. |
| 8,535,841 | B1 | 9/2013 | Gasda et al. |
| 9,059,455 | B2 | 6/2015 | Gasda et al. |
| 2005/0173061 | A1 | 8/2005 | Xie |
| 2007/0082250 | A1 | 4/2007 | Suzuki et al. |

FOREIGN PATENT DOCUMENTS

WO    WO2005/076394 A2    8/2005

*Primary Examiner* — Ula C Ruddock
*Assistant Examiner* — Frank A Chernow
(74) *Attorney, Agent, or Firm* — The Marbury Law Group, PLLC

(57) ABSTRACT

System and methods for refurbishing fuel cell stack components, the methods including singulating the stack using a splitting apparatus or a liquid nitrogen bath. Fuel cell debris may be removed from interconnects of the fuel cell stack using laser heating, flame heating, a die, sonication, a nubbed roller, grit blasting, and/or a high pressure fluid.

19 Claims, 15 Drawing Sheets

SYSTEMS AND METHODS FOR RECYCLING FUEL CELL STACK COMPONENTS

FIELD

The present invention is directed to systems and methods of recycling fuel cell stack components, such as interconnects.

BACKGROUND

A typical solid oxide fuel cell (SOFC) stack includes multiple fuel cells separated by interconnects (IC) which provide both electrical connection between adjacent cells in the stack and channels for delivery and removal of fuel and oxidant. When hydrocarbons are used for fuel, some of the hydrocarbons may catalytically decompose or crack on the surface of the interconnect, leaving a deposit of coke. These coke deposits can clog the channels adversely affecting the performance of the fuel cell stack.

The fuel cell stack may be reconditioned, however, by refurbishing the interconnects. A typical IC refurbishment process may include the following steps: (1) singulation (separating ICs/individual fuel cells from one another), (2) removal of electrolyte debris from the IC, (3) removal of any other remaining internal stack components (if any) from the IC and (4) removal of high temperature adhesives, seals and protective coatings.

Prior singulation method includes mechanically prying the stack apart using a hand held tool. This process is time-consuming and prone to damaging the interconnects, by chipping, cracking, or inducing camber (curvature).

After singulation, most of the electrolyte can be scraped off, but material left around the seal region is typically very well adhered to the IC and hard to remove. The last step to achieving a clean part is typically removing the metal oxide (e.g., chromium oxide) that grows on the fuel side of the chromium alloy IC and residual oxide seal material. A grit blasting process typically used in removing these oxides is costly, time consuming, difficult to control, and can cause damage to the part by inducing camber and excessive erosion of the part.

SUMMARY

According to various embodiments, provided is a splitting apparatus comprising: a main body; an alignment plate configured to receive a fuel cell stack; at least one arm connected to the main body and configured to move with respect to the main body; and wedges configured to be inserted into the stack and separate components of the stack.

According to various embodiments, provided is a method of using the splitting device to separate components of a fuel cell stack, the method comprising: aligning the wedges to openings in the stack and the alignment plate; inserting the wedges into the openings in the stack to separate components of the stack; and removing the separated components.

According to various embodiments, provided is a method of removing fuel cell debris from an interconnect, the method comprising: disposing the interconnect on a die comprising a rib; and applying pressure to at least one of the interconnect and the die, such that the rib separates the fuel cell debris from the interconnect.

According to various embodiments, provided is a method of removing fuel cell debris from an interconnect, the method comprising scanning a laser beam across the fuel cell debris adhered to the interconnect to remove the debris.

According to various embodiments, provided is a method of singulating a fuel cell stack, the method comprising: disposing the stack in a liquid nitrogen bath to separate components of the stack; and removing the separated components from the liquid nitrogen bath.

According to various embodiments, a method of recycling fuel cell stack components, comprising: singulating the stack into separate interconnects; removing fuel cell electrolyte from the interconnects; removing metal contacts from the interconnects; removing seal material from the interconnects; and removing a coating from the interconnects.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods for refurbishing components, such as interconnects (ICs), of a fuel cell stack, such as a solid oxide fuel cell (SOFC) stack. Embodiments include methods of singulating, electrolyte removal, metal contact (e.g., nickel mesh) removal, seal and adhesive removal, and interconnect coating removal. The various methods of singulating, electrolyte removal and contact, seal, adhesive and coating removal may be used either singly or in combination or in combination with conventional techniques.

Figure 1A:
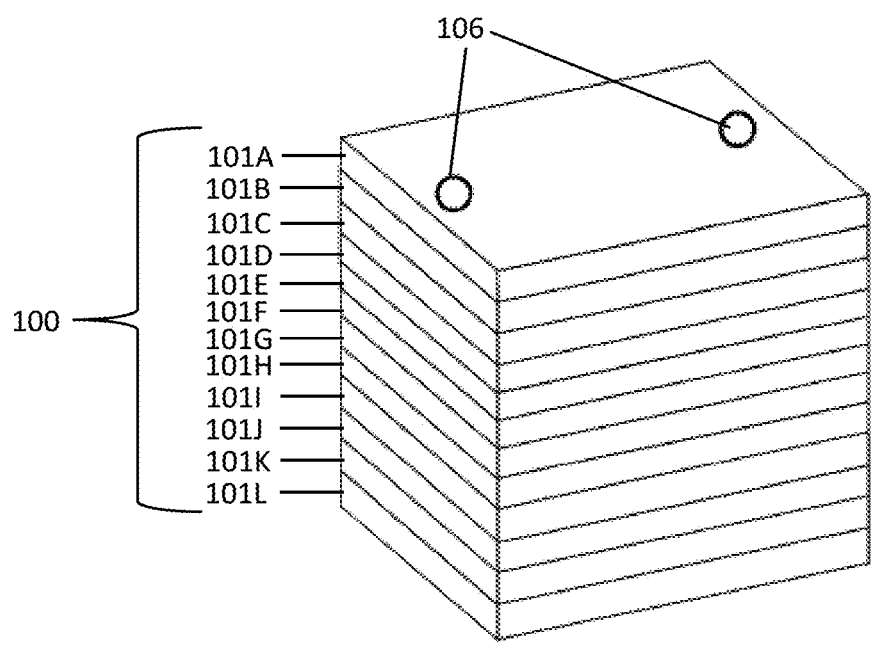
FIGS. 1A and 1B schematically illustrate a method and apparatus for singulating components of a fuel cell stack using compressed fluid according to one embodiment.
Figure 1B:
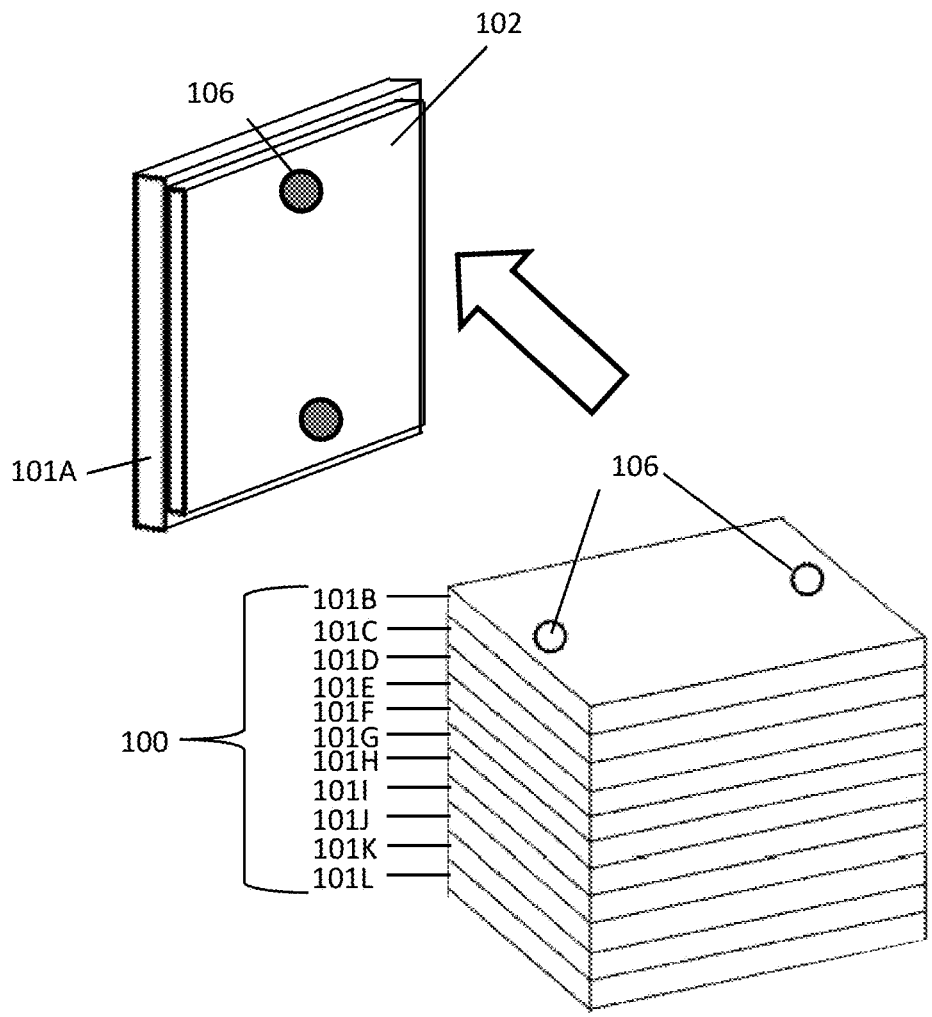

An example of a fuel cell stack 100 is illustrated in FIGS. 1A and 1B. The fuel cell stack 100 comprises a plurality of layers, where each layer may comprise an interconnect 101A-101L. The interconnects 101A-101L may have a planar configuration, such as shown in FIGS. 1A and 1B, or other geometries, such as a tubular configuration. A plurality of fuel cells 102 may be provided between each interconnect 101A-101L. In one embodiment, each of the fuel cells 102 may comprise a solid oxide fuel cell (SOFC), which may include a solid oxide electrolyte material having a cathode electrode on a first (e.g., air-side) surface and an anode electrode on a second (e.g., fuel-side) surface, as is known in the art. For example, the electrolyte may comprise a stabilized zirconia, such as yttria or scandia stabilized zirconia, and/or a doped ceria, such as samaria or scandia doped ceria, the anode electrode may comprise a nickel cermet, such as a nickel-stabilized zirconia and/or nickel-doped ceria cermet, and the cathode electrode may comprise a conductive perovskite material, such as lanthanum strontium manganite (LSM).

Each of the interconnects 101A-101L may comprise an electrically conductive material, such as metal (e.g., a chromium-iron alloy, such as 4-6 weight percent iron, optionally 1 or less weight percent yttrium and balance chromium alloy), and may electrically connect the anode or fuel-side of one fuel cell to the cathode or air-side of an adjacent fuel cell. The interconnects 101 may also separate fuel, such as a hydrocarbon fuel, flowing to the anode-side of one cell in the stack 100 from oxidant, such as air, flowing to the cathode-side of an adjacent cell in the stack 100. Each interconnect 101 may be sealed or otherwise mechanically adhered to a surface of one or both of the adjacent fuel cells 102 in the assembled fuel cell stack 100.

The fuel cell stack 100 typically includes at least one internal fluid conduit, such as conduits 106 shown in FIGS. 1A and 1B. The conduits 106 may extend through multiple layers of the stack 100, and generally extend through the entire stack 100. The conduits 106 may be formed by holes or openings that are provided through the interconnects 101A-101L, as well as through the fuel cells 102 provided between the interconnects. The openings may be aligned with each other such that when the stack is fully assembled, the openings form a continuous fluid conduit through multiple cells of the stack. A conduit 106 so formed (e.g., a riser channel) may be used to carry fuel through the stack 100, so that the fuel may be conveyed to the anode sides of each of the fuel cells 102 forming the stack. A second, or return conduit 106 may be provided to remove spent fuel from each cell 102 and out of the stack 100. Such a stack 100 may be internally manifolded for fuel and externally manifolded for air. Thus, the stack may be open on at least two sides to allow oxidant (e.g., air) to flow across the cathode sides of each fuel cell. Alternatively, the stack 100 may be internally manifolded for both air and fuel, in which case additional conduit(s) for bringing air to and from the cathode sides of each fuel cell may be provided.

Figure 2A:
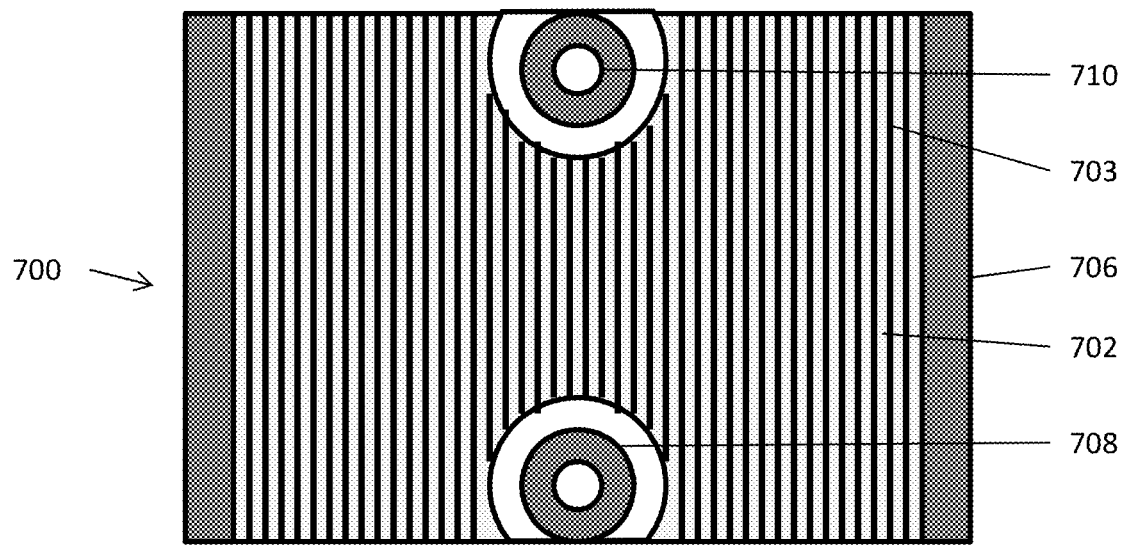
FIG. 2A illustrates an air side of an interconnect according to various embodiments of the present disclosure.
Figure 2B:
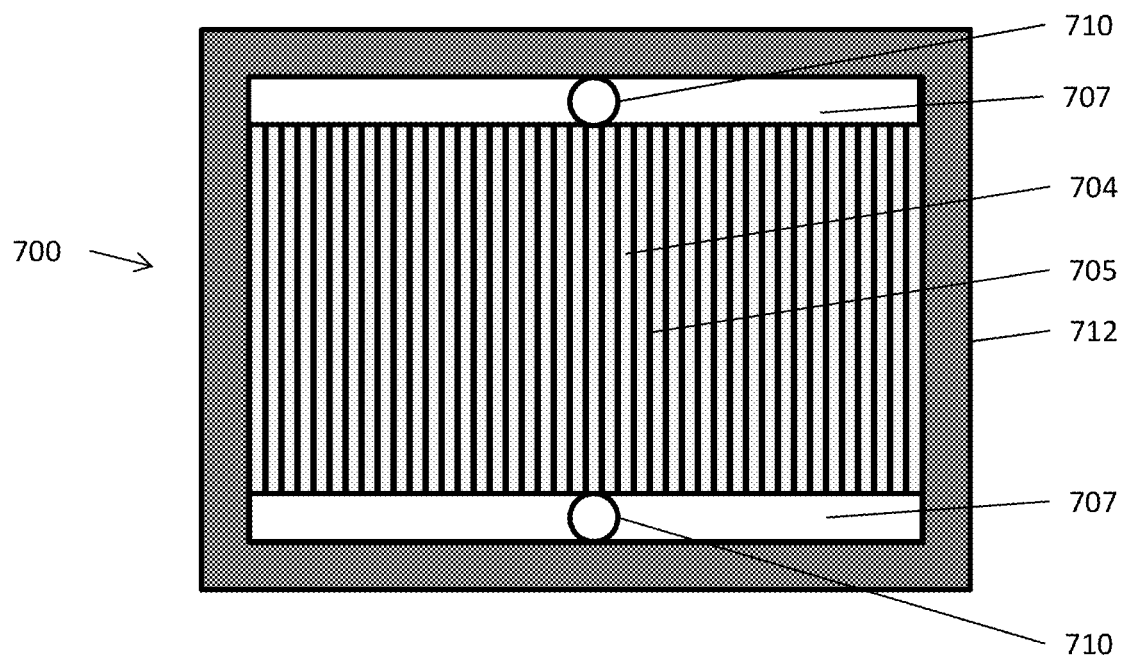
FIG. 2B illustrates a fuel side of the interconnect according to various embodiments of the present disclosure.

FIG. 2A illustrates an air side of an interconnect 700, and FIG. 2B illustrates a fuel side of the interconnect 700. Referring to FIG. 2A, the air side includes ribs 703 disposed between air channels 702. Air flows through the air channels 702 to a cathode electrode of a fuel cell attached to the ribs 703. Ring seals 708 may surround fuel holes 710 of the interconnect 700 to prevent fuel from contacting the cathode electrode. Peripheral strip shaped seals 706 are located on the peripheral portions of the air side of the interconnect 700. The peripheral portions may be an elevated plateau which does not include ribs or channels. The surface of the peripheral regions may be coplanar with tops of the ribs 703.

Referring to FIG. 2B, the fuel side of the interconnect 700 includes ribs 705 disposed between fuel channels 704, and fuel manifolds 707. Fuel flows from one of the fuel holes 710, into the adjacent manifold 707, through the fuel channels, and to an anode of a fuel cell attached to the ribs 705. Excess fuel may flow into the other fuel manifold 707 and then into the adjacent fuel hole 710. A hollow rectangle frame shaped seal 712 is located over the peripheral region of the fuel side of the interconnect 700. The peripheral portion may be an elevated plateau which does not include ribs or channels. The surface of the peripheral region may be coplanar with tops of the ribs 705.

After a fuel cell stack has been singulated, fuel cell debris may remain attached to the air side, the fuel side, or both, by the seals 706, 708, 712 and/or by adhesion to the ribs 703, 705 and/or channels 702, 704. As such, there is a need to separate fuel cell debris from interconnects, after a fuel cell stack has been singulated.

Figure 3A:
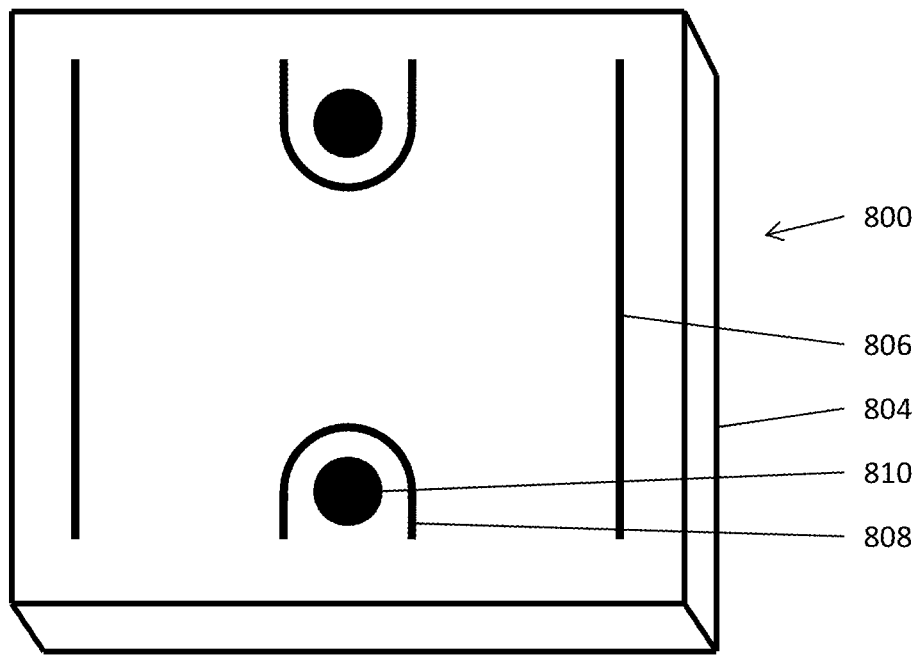
FIGS. 3A and 3B illustrate dies configured to separate fuel cell debris from interconnects, according to various embodiments of the present disclosure.
Figure 3B:
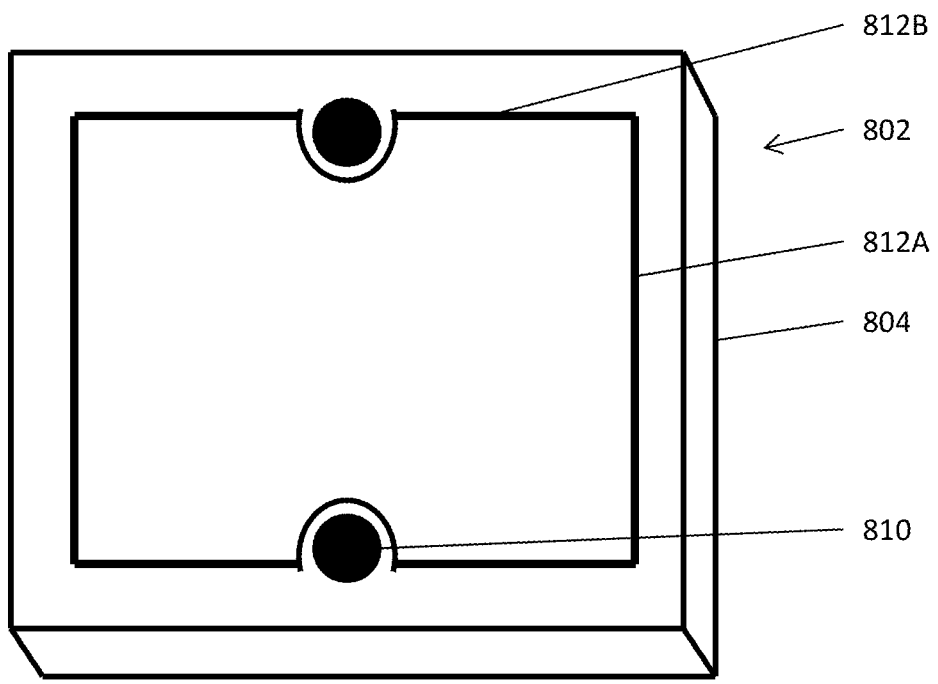

FIGS. 3A and 3B illustrate dies configured to separate fuel cell debris from interconnects, according to various embodiments of the present disclosure. In particular, FIG. 3A illustrates an air-side die 800 configured to remove fuel cell debris attached to the air side of an interconnect, and FIG. 3B illustrates a fuel-side die 802 configured to remove fuel cell debris attached to a fuel side of an interconnect. The fuel cell debris may include a fuel cell electrolyte, seal material, electrodes, and any other fuel cell-related debris.

Referring to FIG. 3A, the air-side die 800 includes a substrate 804, and side ribs 806, post ribs 808, and posts 810 that extend from the substrate 804. The side ribs 806 are configured to align with air channels 702 adjacent to the peripheral regions 706. The post ribs 808 are configured to align with the ring seals 708. The posts 810 are configured to alight with the fuel holes 710.

Referring to FIG. 3B, the fuel-side die 802 may include a substrate 804, and a frame rib 812 and posts 810 that extend from the substrate 804. The frame rib 812 may include vertical ribs 812A and horizontal ribs 812B. The posts 810 are configured to align with the fuel holes 710. The vertical ribs 812A are configured to align with corresponding fuel channels 704, and the horizontal ribs 812B are configured to align with the manifolds 707.

The dies 800, 802 may be formed of wood, metal, plastic, a combination thereof, or any suitable materials. For example, the ribs may be formed of a metal such as steel or any suitable material strong enough to withstand pressures involved with cracking fuel cell debris. The substrate 804 may be formed of a material, such as wood or plastic, which is strong enough to secure the ribs in position. However, the substrate 804 may be formed of a material that is softer than the interconnect 700, such that the substrate 804 does not damage the interconnect 700 when pressure is applied.

Figure 4:
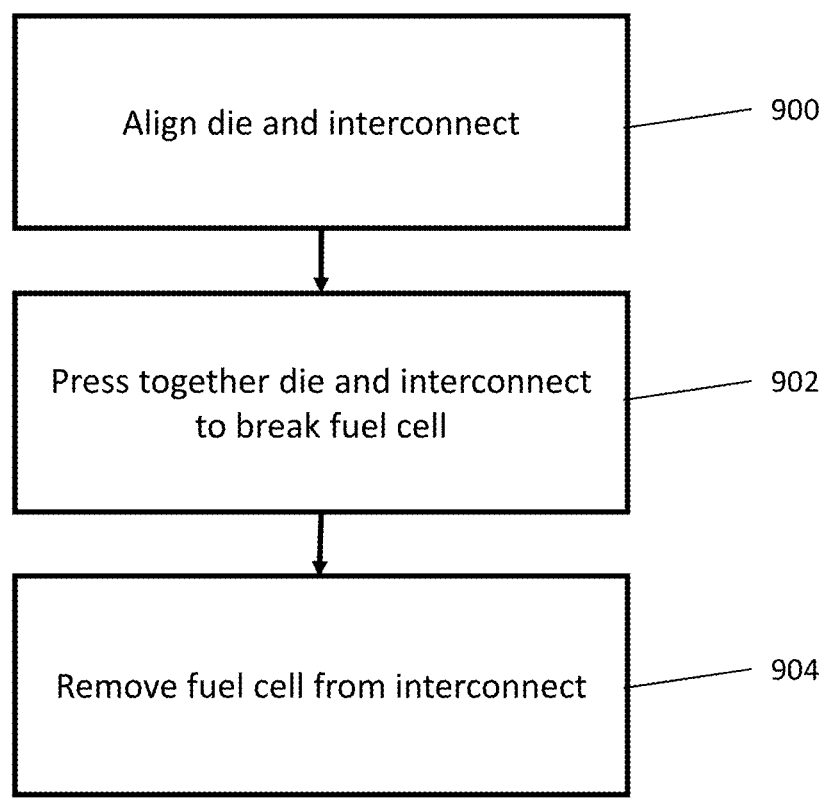
FIG. 4 is a process flow diagram of a method of removing fuel cell debris attached to an interconnect, according to various embodiments of the present disclosure.

FIG. 4 illustrates a method of removing fuel cell debris attached to an interconnect 700, according to various embodiments of the present disclosure. The method may be applied to remove fuel cell debris attached to the fuel side or the air side on an interconnect 700, by selecting the appropriate die, as discussed below.

Referring to FIG. 4, in step 900, if a fuel cell debris is attached to the air side of an interconnect 700, the interconnect 700 may be aligned with the air side facing the air-side die 800, such that the fuel cell debris is disposed between the air-side die 800 and the interconnect 700 and the posts 810 are inserted into the fuel holes 710. If the fuel cell is attached to the fuel side of the interconnect 700, the interconnect 700 may be aligned with the fuel side facing the fuel-side die 802, such that the fuel cell debris is disposed between the fuel-side die 802 and the interconnect 700, and the posts 810 are inserted into the fuel holes 710.

In step 902, the die 800/802 and the interconnect 700 are pressed together, such that the ribs 806, 808, 812 break apart the fuel cell debris connected to the interconnect 700, such as a seal material and/or ceramic fuel cell material (e.g., electrolyte). In the case of the fuel cell debris attached to the air side of the interconnect 700, the side ribs 806 may be aligned with corresponding air channels 702 just inside the strip shaped seals 706 to crack fuel cell electrolyte disposed over the channels 702. The post ribs 808 may crack the electrolyte located over or just inside the ring seals 708. In the case of the fuel cell debris attached to the fuel side of the interconnect 700, the vertical ribs 812A crack the electrolyte located over corresponding fuel channels 704 located just inside the frame shaped seal 712, and the horizontal ribs 812B crack the electrolyte over the fuel manifolds 707. In either case, the ribs may apply line stress, causing local cracking of fuel cell debris (e.g., of the ceramic electrolyte).

In step 904, the die 800/802 and the interconnect 700 are separated and the fuel cell is removed from the interconnect 700. In particular, since the electrolyte is broken, the attachment between most of the electrolyte and the interconnect 700 is broken, and the electrolyte can be easily removed. Any remaining part of the electrolyte attached to the seals 706, 708 and 712 in the peripheral regions, may be removed using a laser or by heat treatment (e.g., a flame) as described below. According to some embodiments, the method may be applied to a high-speed automated machine.

Figure 5:
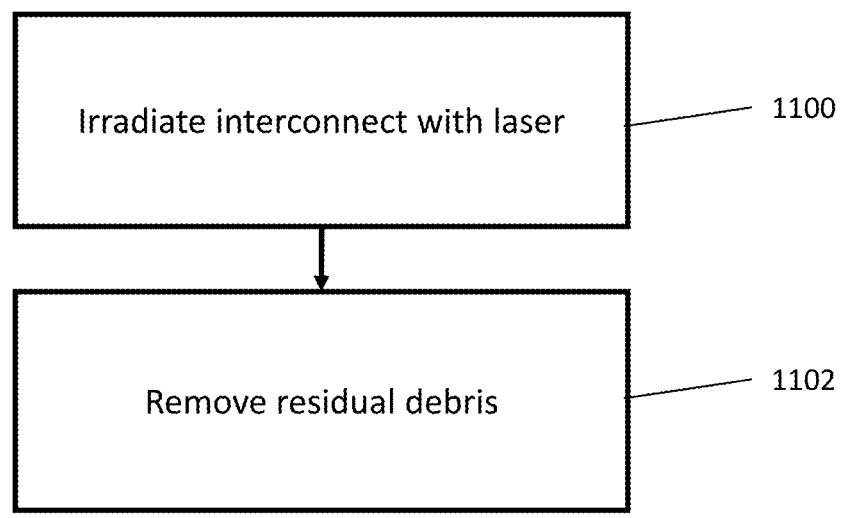
FIG. 5 is a process flow diagram illustrating a method of removing fuel cell debris from an interconnect, according to various embodiments of the present disclosure.

FIG. 5 is a process flow diagram illustrating a method of removing fuel cell debris from an interconnect using a laser, according to various embodiments of the present disclosure. Referring to FIG. 5, in step 1100, an interconnect is irradiated using a laser. During the irradiation, the interconnect may be held in a vertical position. This may allow for the easy collection of removed fuel cell debris. According to some embodiments, a single laser may be used to irradiate one or both opposing sides of the interconnect (e.g., including sides having attached fuel cell debris). In other embodiments, one or more lasers may be used to irradiate each side of the interconnect. For example, two lasers may be used to simultaneously irradiate opposing sides of the interconnect.

Each laser may be controlled with a scanner that will control scanning of the laser across the interconnect. For example, the laser may be scanned in a raster pattern or a serpentine pattern, to irradiate the interconnect (e.g., irradiate sides of the interconnect that include fuel cell debris, such as entire or parts of the electrolyte and/or seals).

In step 1102, any residual debris may be removed from the interconnect. For example, compressed air may be applied to the interconnect, or the interconnect may be brushed.

Accordingly, fuel cell debris may be removed from an interconnect in a rapid manner. Line speeds of the laser may be in excess of 24 inches per second (e.g., 25 to 500 inches per second). Laser exposure times for the fuel cell debris may be less than 1 sec (e.g., 0.05 to 0.9 sec). In some embodiments, an interconnect may be exposed to a 1.9 kWatt $CO_2$ laser travelling at 5 meters/sec. However, the present disclosure is not limited to any particular type of laser, travelling time, or exposure time. The laser provides heat that causes the fuel cell debris to delaminate from the interconnect. For example, the laser heat may melt seals bonding other fuel cell debris to the interconnect, resulting in the removal of such materials.

Figure 6A:
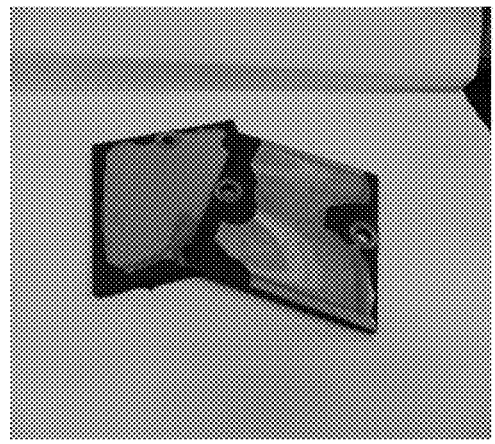
FIG. 6A is a photograph of interconnects containing fuel cell debris, prior to laser exposure, according to various embodiments of the present disclosure.
Figure 6B:
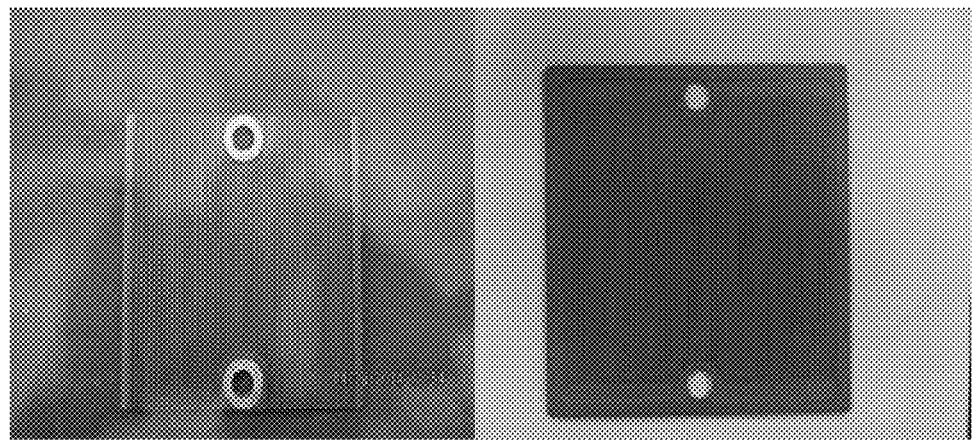
FIG. 6B is a photograph of the interconnects of FIG. 6A, after laser exposure, according to various embodiments of the present disclosure.

FIG. 6A is a photograph of interconnects containing fuel cell debris, prior to laser exposure. FIG. 6B is a photograph of the interconnects after laser exposure. As can be seen in FIGS. 6A and 6B, the laser exposure process leaves no visible trace of fuel cell debris.

Figure 7:
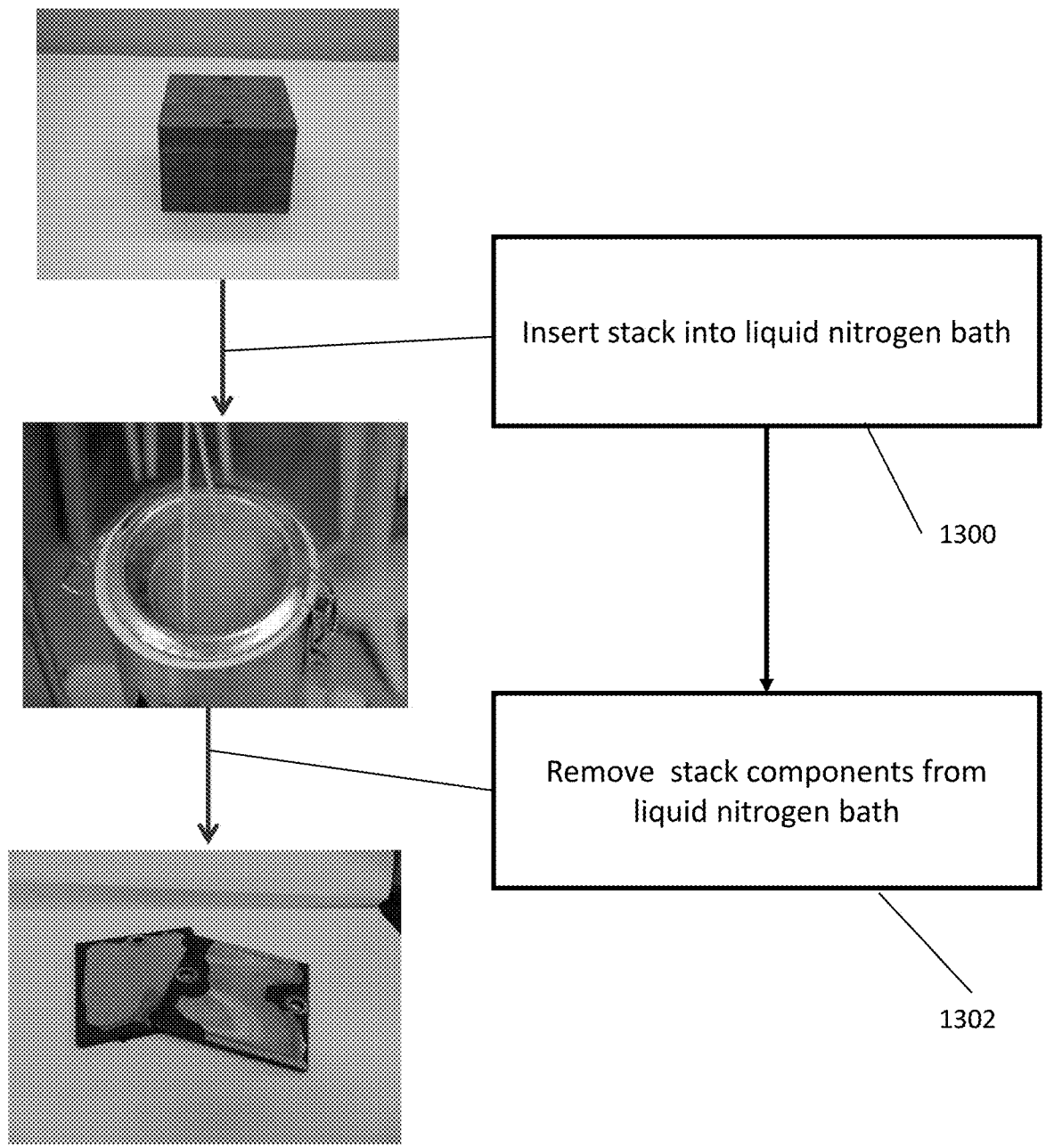
FIG. 7 includes photographs and a box diagram illustrating a method of singulating components of a fuel cell stack, according to various embodiments of the present disclosure.

FIG. 7 includes photographs and a process flow diagram illustrating a method of singulating components of a fuel cell stack using liquid nitrogen, according to various embodiments of the present disclosure. Referring to FIG. 7, in step 1300, a fuel cell stack is inserted into a liquid nitrogen bath. The liquid nitrogen rapidly cools the stack, and differences in thermal expansion rates of the electrolyte and the interconnects of the stack result in the cracking of the electrolyte and singulation of stack components. In some embodiments, the liquid nitrogen may selectively infiltrate the electrolyte, resulting in more rapid cooling and cracking thereof, as compared to the interconnects.

In step 1302 the singulated stack components are removed from the liquid nitrogen bath. Thus, stacks can be split at a high throughput rate. Any remaining fuel cell debris may be removed using sonication, laser or other heating.

For example, an acoustic shock from a sonic power source may be used to shatter oxide seals which are adhered to a part (e.g., an interconnect) of the stack to remove debris using sonication. High frequency acoustic energy may be directed at the interconnect to shatter the seal material adhered to the interconnect. A single frequency or set of frequencies or spectrum of frequencies may be selected such that the seals are reliably destroyed but the interconnects are not damaged. For example, an interconnect containing adhered seals and/or electrolyte is inserted into a sonication bath, such as a water bath. The sonication bath may be an ultrasonic/megasonic bath that induces vibration between the electrolyte and interconnect. During the sonication bath, the frequency by the sonication may be varied. For example, the frequency may be swept across a sonication band to hit a resonance frequency of the interconnect and/or electrolyte to initiate electrolyte cracking. Further, the sonication bath may include chemicals configured to break-down the electrolyte. A piezocrystal may be used to induce vibration in the bath.

Alternatively, the interconnect may be heated using any suitable heating, such as induction, IR, laser, microwave heating, etc. The heating may induce thermal shock in the interconnect, seals and/or electrolyte, which may enable residual fuel cell debris to be easily cleaned from the interconnect.

Figure 8:
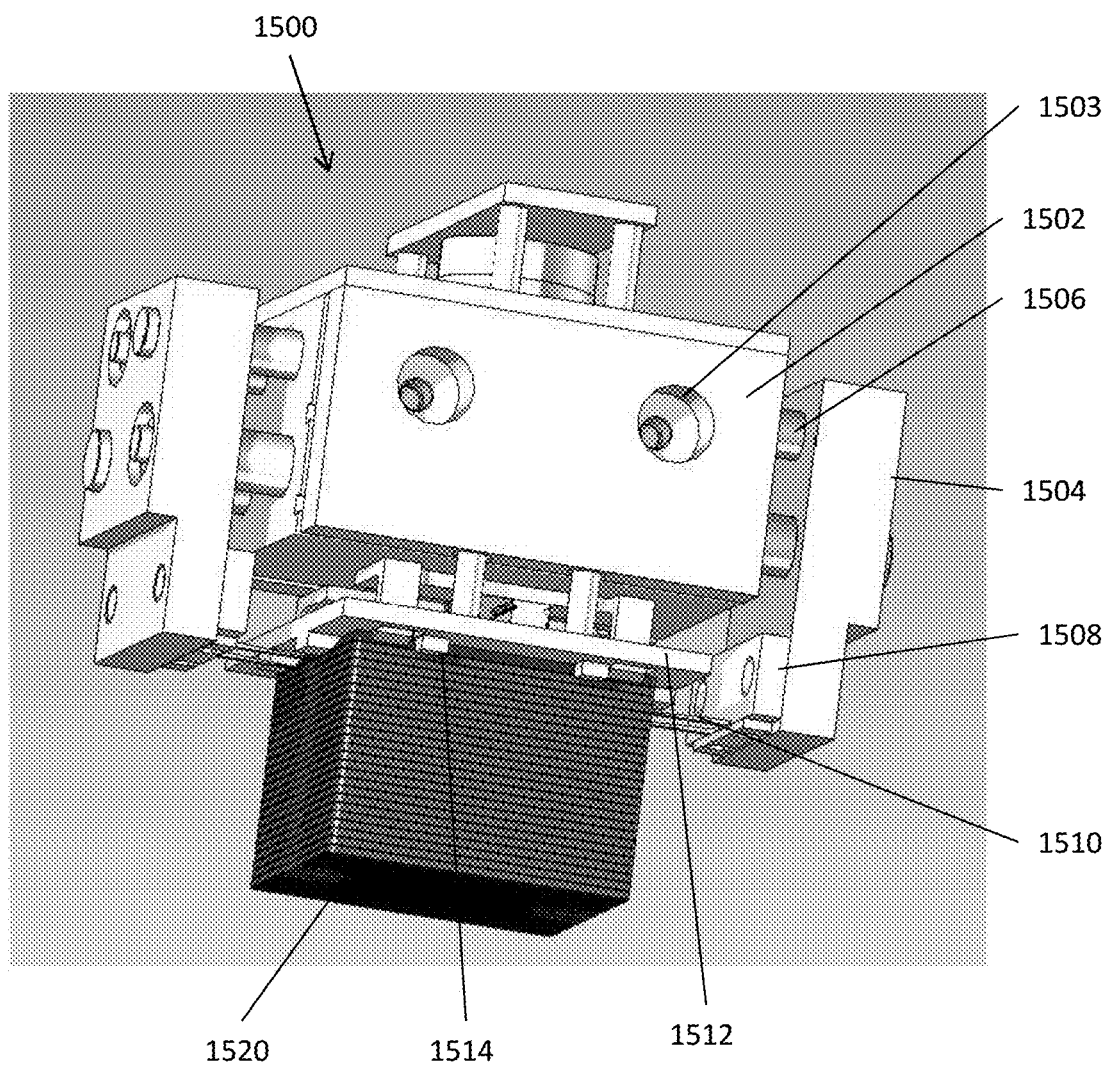
FIG. 8 illustrates a perspective view of a fuel cell stack splitting apparatus according to various embodiments of the present disclosure.

FIG. 8 illustrates a fuel cell stack splitting apparatus 1500 according to various embodiments of the present disclosure. Referring to FIG. 8, the splitting apparatus 1500 includes a main body 1502, arms 1504, grippers 1508, and a positioning plate 1512. The arms 1504 may be connected to cylinders 1506 (e.g., pneumatic or hydraulic cylinders) that extend and contract with respect to the main body 1502, according to an amount of pressure inside the main body 1502. The main body 1502 may include connection ports 1503 configured for attachment to a pressurized fluid source. According to some embodiments, the main body 1502 may be configured to receive a pneumatic fluid or a hydraulic fluid, in order to actuate the arms 1504 via the cylinders 1506.

The grippers 1508 may be attached to ends of the arms 1504. Each gripper 1508 may contain two or more wedges 1510. The thickness of the wedges 1510 may vary, such that a distal end of each wedge 1510 (e.g., free ends) is thinner than a proximal end thereof (e.g., end attached to arms 1504). The positioning plate 1512 may include bars 1514 configured to align a fuel cell stack 1520 with the positioning plate 1512. According to some embodiments, the splitting apparatus 1500 may be connected to a robotic arm or other suitable positioning device, such that the splitting apparatus 1500 may be positioned with respect to the stack 1520.

During operation, the splitting apparatus 1500 may be positioned above the stack 1520, such that the stack 1520 contacts the positioning plate 1512. The bars 1514 insure that the stack 1520 and the splitting apparatus 1500 are properly positioned with respect to one another.

Figure 10A:
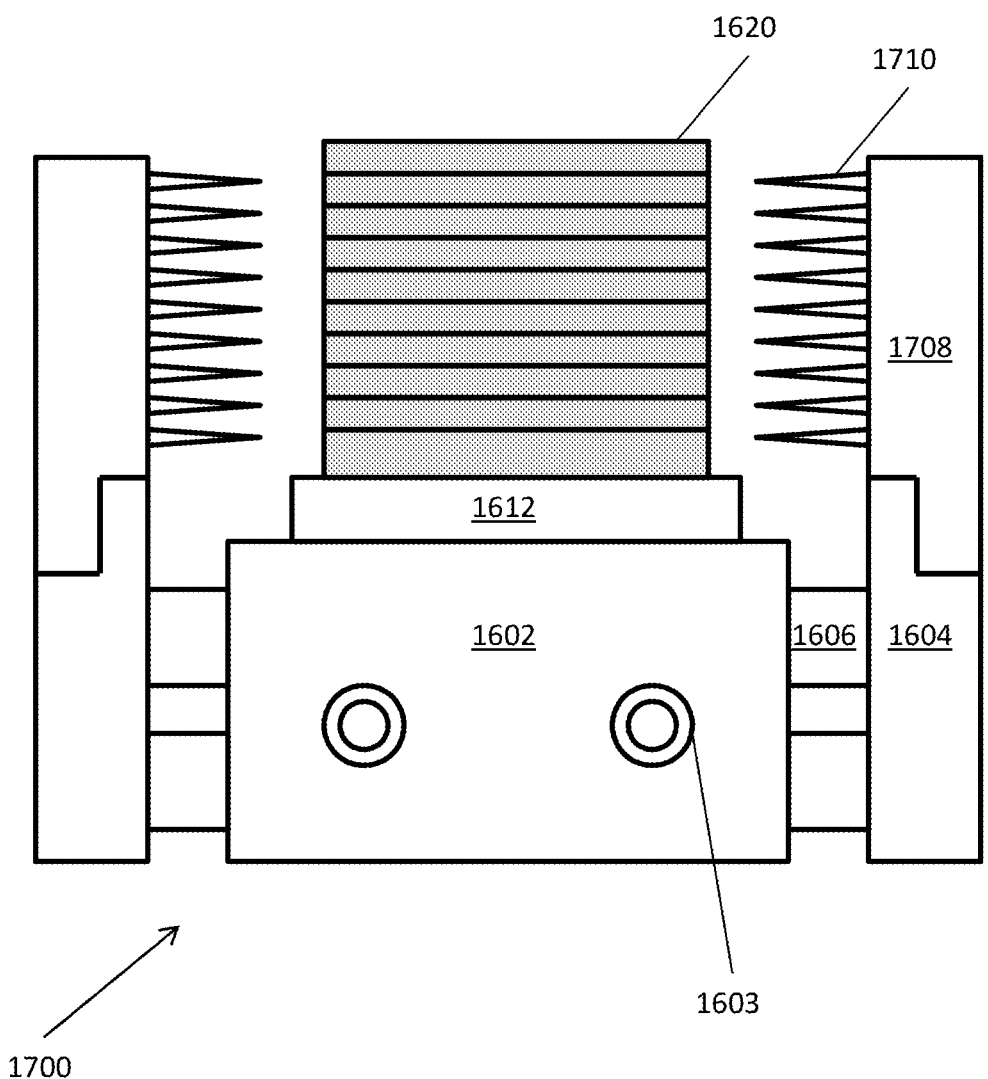
FIG. 10A illustrates a perspective view of a splitting apparatus according to various embodiments of the present disclosure.

Once in position, the arms 1504 may be contracted towards the main body 1502, such that the wedges 1510 engage the stack 1520. The wedges 1510 may enter the stack through air inlet openings to the air channels in of interconnects in the opposite sides of the stack 1520. As the wedges 1510 are inserted into the stack 1520, the wedges 1510 separate components of the stack 1520 from one another. As shown in FIG. 10A, the grippers 1508 may each contain multiple pairs of the wedges 1510, such that multiple components of the stack 1520 may be separated at the same time.

Figure 9:
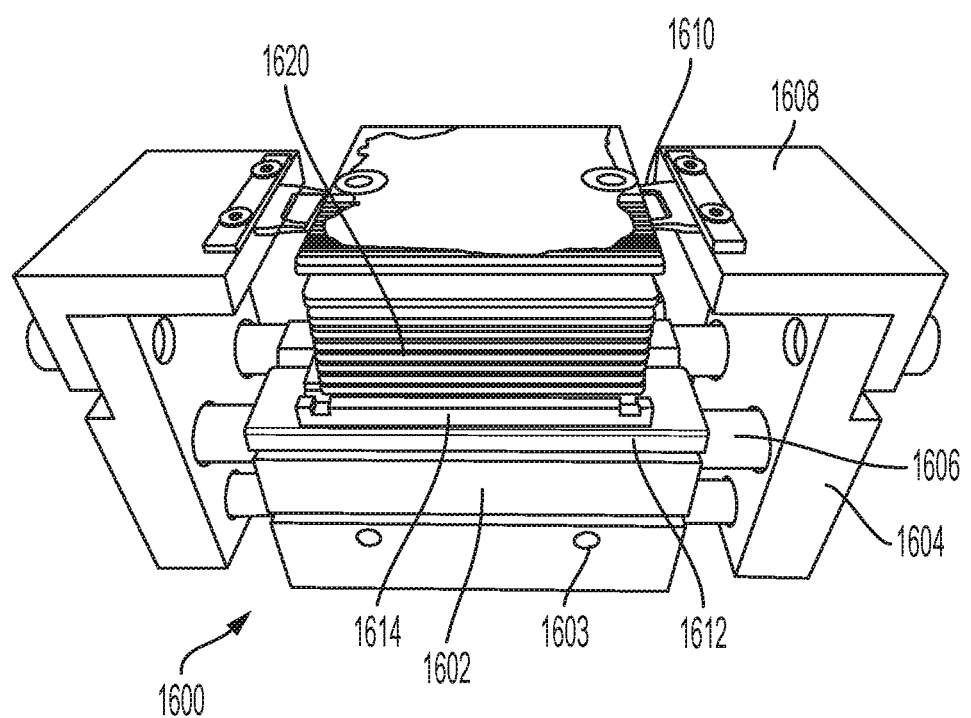
FIG. 9 illustrates a perspective view of a splitting apparatus according to various embodiments of the present disclosure.

FIG. 9 illustrates a fuel cell stack splitting apparatus 1600 according to various embodiments of the present disclosure. In contrast to the splitting apparatus 1500, the splitting apparatus 1600 is configured to be disposed below a fuel cell stack 1620. The positioning plate 1612 may include bars 1614 that extend along upper edges thereof and that are configured to align the stack 1620 with the positioning plate 1612.

Referring to FIG. 9, the splitting apparatus 1600 includes a main body 1602, arms 1604, grippers 1608, and a positioning plate 1612. The arms 1604 may include cylinders 1606 (e.g., pneumatic or hydraulic cylinders) configured to be extended and contracted with respect to the main body 1602, according to an amount of pressure applied inside the main body 1602. The main body 1602 may include connection ports 1603 configured for attachment to a pressurized fluid source.

The grippers 1608 may be attached to ends of the arms 1604. Each gripper 1608 may contain two or more wedges 1610. The thickness of the wedges 1610 may vary along the lengths thereof, such that a distal end of each wedge 1610 (which is inserted into the stack) is thinner than a proximal end thereof. The positioning plate 1612 may be configured to vertically align the fuel cell stack 1620 by raising or lowering it, such that the wedges are positioned to sequentially remove an uppermost interconnect from the stack 1620.

FIG. 10A illustrates a splitting apparatus 1700 according to various embodiments of the present disclosure. The splitting apparatus 1700 is similar to the splitting apparatus 1600, so only the differences therebetween will be described in detail, and like reference numbers designate similar elements.

Referring to FIG. 10A, the splitting apparatus 1700 includes grippers 1708 that each comprise a plurality of pairs of wedges 1710 Each pair of wedges 1710 may be positioned to be inserted between two components of a stack 1620 in the fuel cell stacking direction (e.g., the wedges 1710 are configured to separate interconnects in a vertical direction. In other words, four wedges 1710 may be used to separate two components from one another at the same time. However, the present disclosure is not limited to any particular arrangement of the wedges 1710. Accordingly, the splitting apparatus can simultaneously separate multiple adjacent pairs of components of the stack 1620. While each gripper 1708 is shown to include nine pairs of wedges 1710, the present disclosure is not limited thereto. For example, the number of pairs of wedges could be set according to the number of components of a fuel cell to be singulated. The splitting apparatus 1700 may also be positioned upside down above the stack 1620, similar to the splitting apparatus 1500.

Figure 10B:
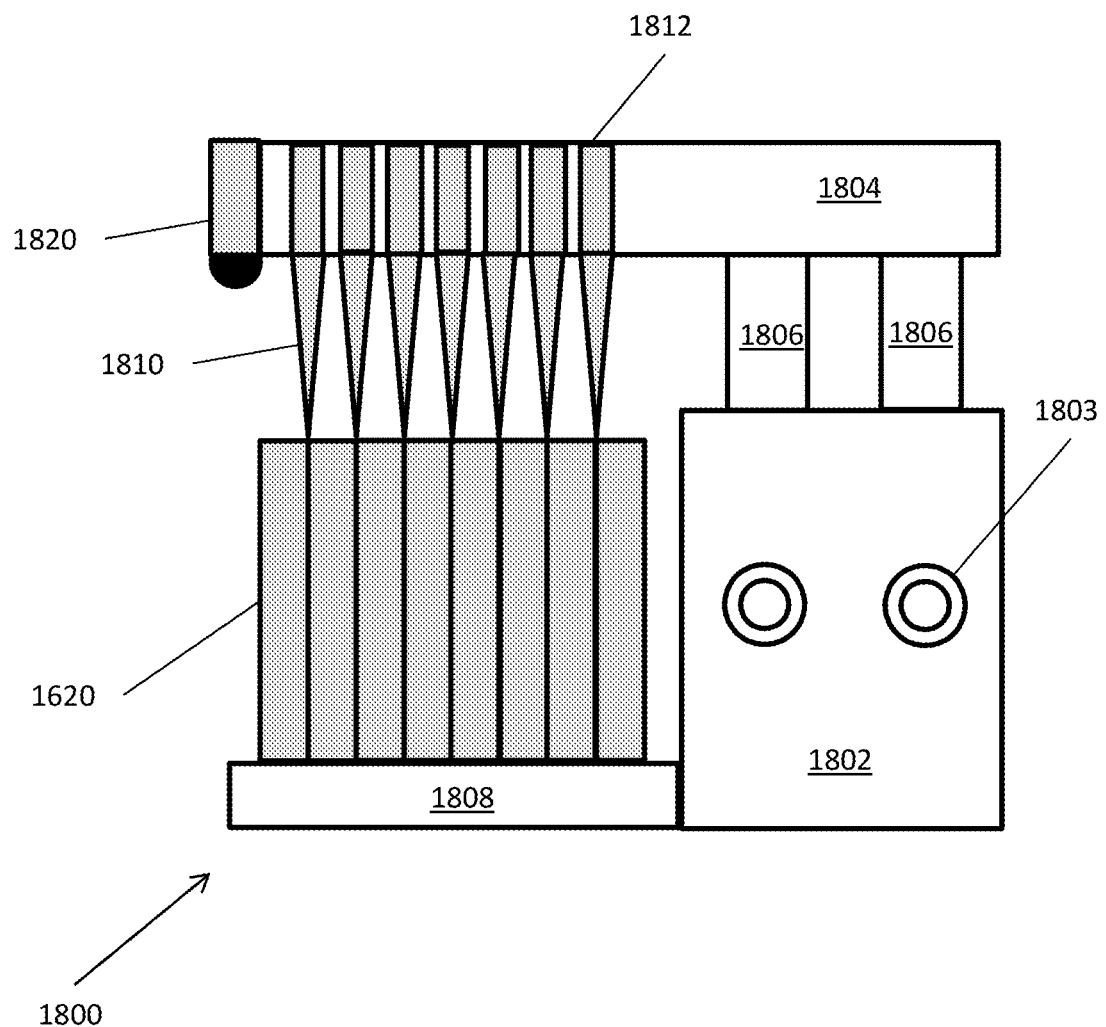
FIG. 10B illustrates a perspective view of a splitting apparatus according to various embodiments of the present disclosure.

FIG. 10B illustrates a fuel cell stack splitting apparatus 1800 according to various embodiments of the present disclosure. Referring to FIG. 10B, the apparatus 1800 includes a main body 1802, an arm 1804 (i.e., a single arm in this embodiment), cylinders 1806, a positioning plate 1808, wedges 1810, and actuators 1812. The cylinders 1806 may be pneumatic or hydraulic cylinders) configured to be extended and contracted with respect to the main body 1802, according to an amount of pressure applied inside the main body 1802. The main body 1802 may include connection ports 1803 configured for attachment to a pressurized fluid source.

The wedges 1810 may be attached to the arm 1804. The thickness of the wedges 1810 may vary along the lengths thereof, such that a distal end of each wedge 1810 (which is inserted into the stack 1620) is thinner than a proximal end thereof. In other words, the distal ends may have a shape similar to the head of a flat head screwdriver. Further, the distal ends of each wedge 1810 may have a greater width than thickness. The wedges 1810 may be arranged in two or more rows on the arm 1804.

The positioning plate 1808 may be configured to support a fuel cell stack 1620 arranged horizontally (i.e., with the interconnect stacking direction being substantially horizontal), such that the wedges 1810 may be inserted into openings in the stack vertically between interconnects of the stack 1620. The openings in the stack may comprise air inlets into the flow channels in the interconnects for a stack that is externally manifolded for air. For example, the positioning plate 1808 may be configured to move the fuel cell stack 1620 horizontally in two dimensions, and/or vertically. Two or more of the wedges 1810 may be inserted between each pair of interconnects of the stack 1620.

The apparatus 1800 may also include an alignment device 1820, such as an optical position detector (for example a photodetector or camera) connected to a control unit, and an optional light source, such as a laser, or the like. The alignment device 1820 is configured to determine the positions of openings (e.g., air inlets into air channels) of the stack 1620 relative to the wedges 1810. Accordingly, the positioning plate 1808 may be controlled according to positional data received from the alignment device 1820, such that the wedges 1810 may be inserted into the openings of the stack 1620.

Once the distal ends of the wedges 1810 are inserted into the stack 1620, the actuators 1812 may be operated to rotate the wedges 1810. For example, the wedges 1810 may be rotated by about 90 degrees. Since the distal ends of the wedges 1810 have a greater width than thickness, the rotation of the wedges 1810 may operate to separate the interconnects of the stack 1620. The actuators 1812 may be configured to rotate the wedges 1810 substantially simultaneously, or simultaneously, and by substantially the same amount. As such, the forces applied to separate the interconnects may be substantially uniform.

Figure 11:
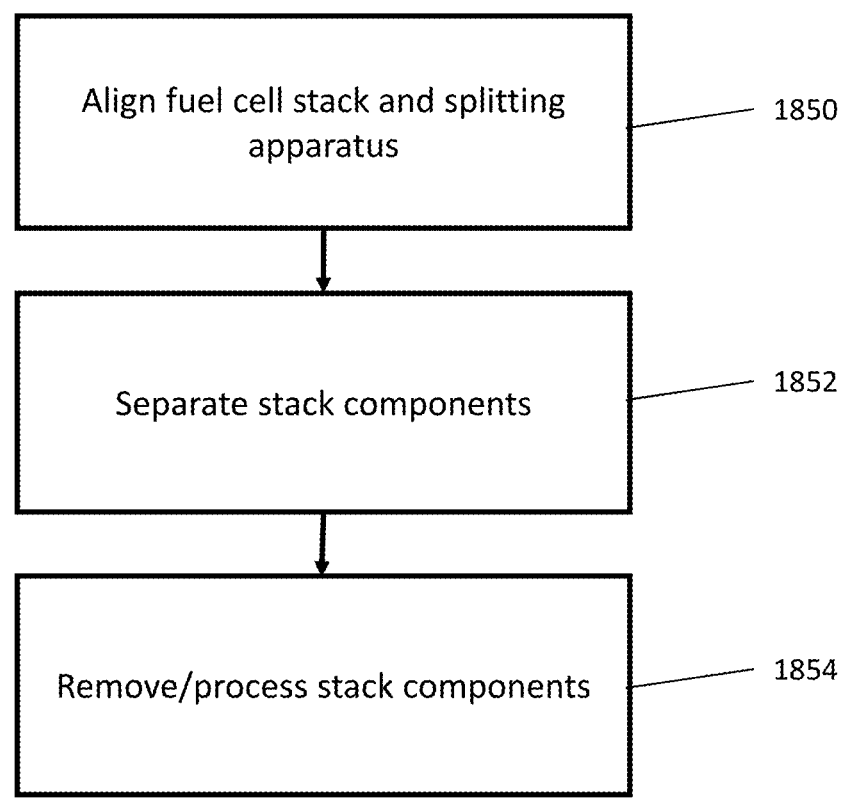
FIG. 11 is a process flow diagram illustrating a method of using a splitting apparatus to separate components of a fuel cell stack, according to various embodiments of the present disclosure.

FIG. 11 is a process flow diagram illustrating a method of using a splitting apparatus to separate components of a fuel cell stack, according to various embodiments of the present disclosure. Referring to FIG. 11, in step 1850 a fuel cell stack and an alignment plate of a splitting device are aligned with one another. The splitting device may be any of the above-identified splitting devices. As such, the splitting device may be disposed below or above the stack, during the alignment process.

In step 1852 the components of the stack are separated. In particular, arms of the splitting device are contracted. For example, the pressure applied to a fluid inside a main body of the splitting device may be changed, such that the arms of the splitting device are contracted towards the main body. As a result, wedges of grippers attached to the arms are forced into the stack. For example, the wedges may be inserted into the stack through air inlets in the side of the stack. The force applied by the wedges results in the separation of stack components. For example, interconnects and fuel cells may be separated from one another. In some embodiments, multiple pairs of fuel cell stack components may be separated at the same time, such as by using the splitting apparatus 1700.

In step 1854, the separated stack components are removed. For example, the separated stack components may be further processed, to remove fuel cell debris adhered to singulated interconnects, such as by laser irradiation, heating, etc.

Figure 12:
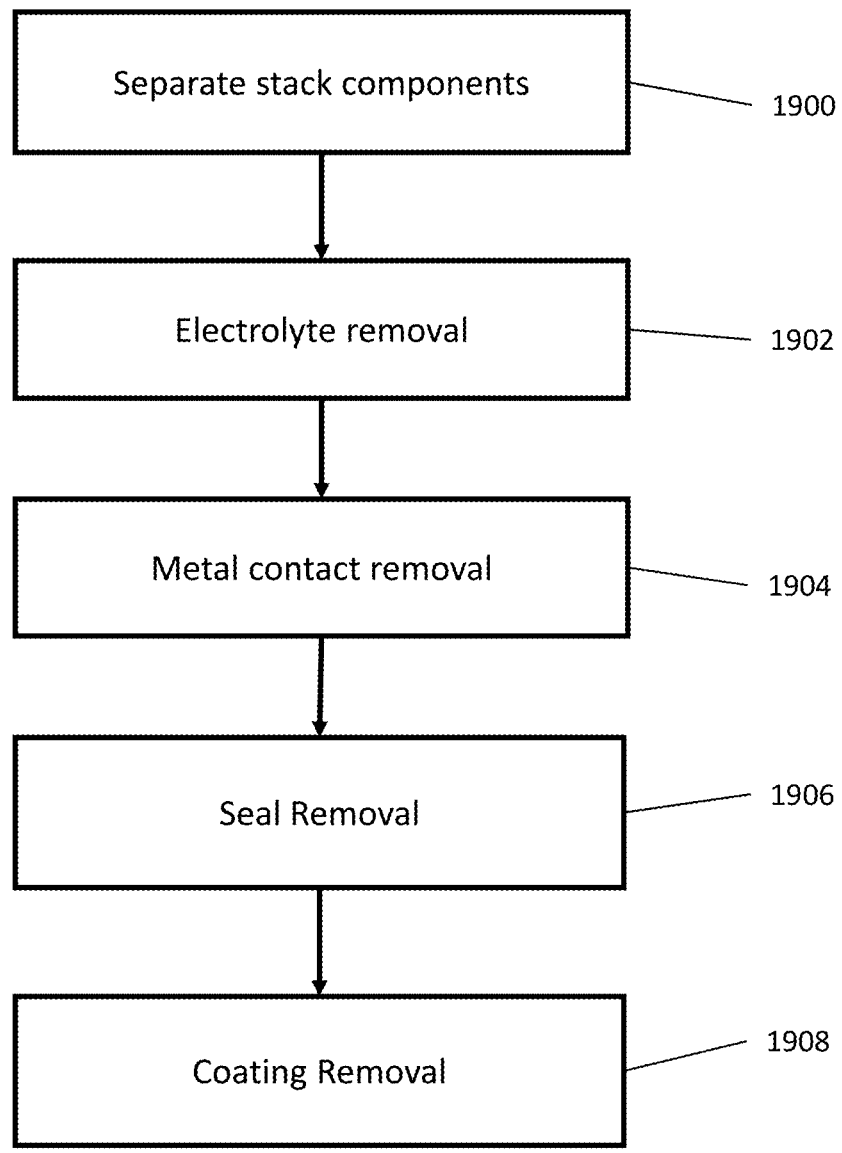
FIG. 12 is a process flow diagram illustrating a method of recycling fuel cell stack components, according to various embodiments of the present disclosure.

FIG. 12 is a process flow diagram illustrating a method of recycling fuel cell stack components, according to various embodiments of the present disclosure. Referring to FIG. 12, in step 1900 fuel cell stack components are singulated. In particular, the stack components, such as interconnects, may be separated using a splitting apparatus as described above, such as splitting apparatus 1500, 1600, 1700 or 1800, or by submerging the fuel cell stack in liquid nitrogen.

In step 1902, electrolyte material may be removed from the interconnects. In particular, the electrolyte material may be removed by using laser heating, a die, flame heating, an ultrasonic treatment, or a nubbed roller, or a high pressure fluid, such as air (e.g., air blasting).

For example, the singulated interconnects with attached debris, such as electrolyte, contact mesh and seal debris, may be provided to a removal apparatus, such as an air blasting apparatus by a conveyor or a mechanical arm. The conveyor may have openings or be formed of a mesh to allow high pressure fluid, such as high pressure air to impact on both sides of the interconnect (e.g., from the top and from the bottom through the conveyor), to remove the electrolyte debris from the interconnects. Alternatively, the singulated interconnects may be placed into trays having an opening in the bottom and the conveyor may provide the trays into the air blasting apparatus where high pressure air impacts both major sides of the interconnect.

Figure 13:
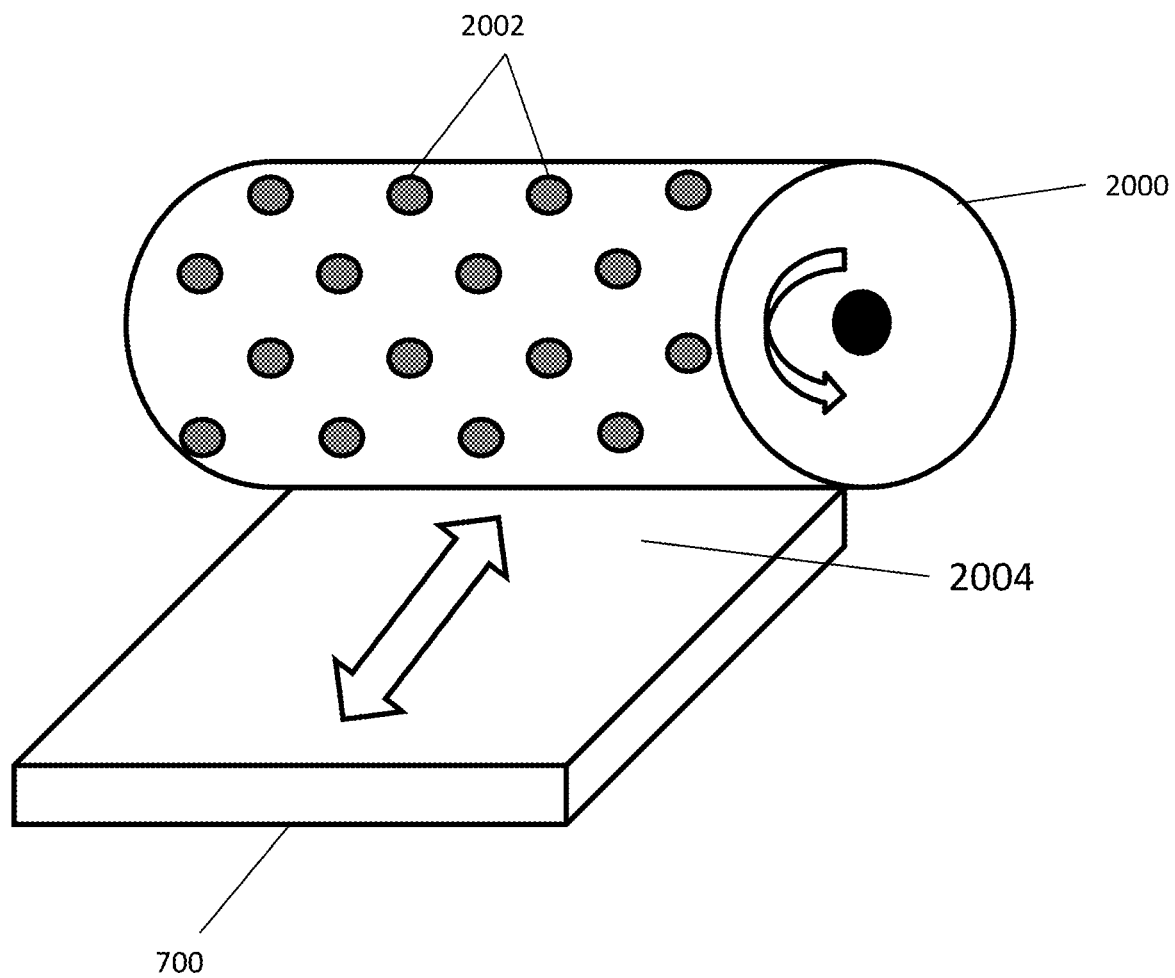
FIG. 13 illustrates a perspective view of using a knobbed roller for cracking an electrolyte adhered to an interconnect according to various embodiments of the present disclosure.

In another example shown in FIG. 13, a nubbed roller 2000 may be rolled in the directions shown by the arrows across the electrolyte 2004 located over the interconnect 700 to crack and remove the electrolyte material. Specifically, the roller 2000 contains nubs (i.e., knobs) 2002 which protrude from the roller. The nubs 2002 push the electrolyte 2004 into the interconnect channels (e.g., air channels 702 on the air side or fuel channels 704 on the fuel side of the interconnect 700 (see FIGS. 2A and 2B). This causes the electrolyte to crack and break.

In step 1904, a metal contact may be removed from the interconnects. In particular, a metallic mesh, such as a nickel mesh may be disposed between a fuel side of an interconnect and an anode of a fuel cell. The metal contact may be removed by using a pin array, an ultrasonic treatment, or grit blasting (e.g., sand blasting using alumina particles), for example.

For example, a pin array may comprise an array of pins attached to a handle. The pins are inserted under the metallic mesh into the air or fuel channels 702 or 704 in the interconnect roughly parallel to the surface of the interconnect 700. The pins are then lifted up to lift off the mesh from the interconnect.

Alternatively, grit blasting may include directing grit blasting media at the mesh to remove the mesh from the interconnect without damaging or removing any of the base interconnect material or the metal oxide coating on the air side of the interconnect. Preferably, the grit blasting media material has a hardness that is greater than that of the metallic (e.g., nickel) mesh but less than that of the interconnect. Examples of grit blast media include sand, alumina, Kieserite, crushed walnut shells or plastic (e.g., melamine type III). The grit blasting may be conducted under either positive or negative pressure, such as a pressure above 30 psig, for example 40 to 100 psig. The duration of the grit blasting may be between 5 seconds and 10 minutes (e.g., Kieserite ~5 seconds, crushed walnut shells ~3-5 minutes or melamine type III ~2 minutes).

In step 1906, any seal material remaining on the interconnects may be removed. In particular, seal material may be removed by laser heating or the like, after the electrolyte and/or metal contact is removed. The laser heating causes a CTE mismatch between the interconnect and the debris (e.g., seal material and remaining electrolyte pieces attached to the seal material) on the interconnect. The CTE mismatch causes the debris (e.g., seal material and attached electrolyte pieces) to pop off the interconnect.

In step 1908, a protective coating may be removed from a cathode (i.e., air) side of the interconnects. In particular, a thin coating of LSM and/or MCO (e.g., manganese cobalt oxide spinel) may be removed from the interconnects by grit blasting (e.g., using any suitable media, such as sand or alumina), a high pressure fluid, or the like.

Step 1902 is preferably carried out after step 1900 and before steps 1904-1908. Steps 1904-1908 may be carried out in any suitable order.

While components, such as interconnects and electrolytes, of a solid oxide fuel cell stack were described above in various embodiments, embodiments can include any other fuel cell components or interconnects, such as molten carbonate or PEM fuel cell components or interconnects, or any other metal alloy or compacted metal powder or ceramic objects not associated with fuel cell systems.

Benefits of the various embodiment methods for refurbishing a component of a fuel cell stack described herein may include a lower cost per part, a higher yield (i.e., less damage to the interconnects), increased scalability, increased reliability, less change to critical dimensions of the interconnect, such as flow channel geometry, and/or easier automation.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of using a splitting apparatus comprising:
a main body;
an alignment plate disposed on the main body and configured to receive a fuel cell stack;
a first arm connected to the main body and configured to move with respect to the main body; and
first wedges attached to the first arm and configured to be inserted into the stack and separate components of the stack, the method comprising:
aligning the first wedges with openings in the stack;
inserting the first wedges into the openings in the stack to mechanically separate components of the stack; and
removing the separated components.

2. The method of claim 1, wherein the inserting of the first wedges comprises changing a pressure applied to a fluid disposed in the main body, such that the first arm moves toward the stack.

3. The method of claim 1, wherein the inserting of the first wedges comprises inserting multiple pairs of the first wedges into openings in at least one side of the stack along a stack stacking direction, such that multiple components of the stack are separated substantially simultaneously.

4. The method of claim 1, wherein the stack is positioned horizontally and the first wedges are inserted into air inlet openings disposed on one side of the stack.

5. The method of claim 1, wherein:
the separated components comprise interconnects; and
the method further comprises irradiating the interconnects with a laser to remove fuel cell debris from interconnects.

6. The method of claim 5, wherein the fuel cell debris comprises at least one of a ceramic electrolyte or a seal material.

7. The method of claim 5, wherein scanning the laser comprises irradiating opposing sides of the interconnect with one or more laser beams.

8. The method of claim 7, wherein the opposing sides of the interconnect are irradiated simultaneously.

9. The method of claim 6, wherein scanning the laser beam comprises scanning the laser beam while the interconnect is disposed in a vertical position.

10. A method of recycling fuel cell stack components, comprising:
singulating the stack into separate interconnects by inserting first wedges into air channel openings exposed on a first side of the stack, using a hydraulically or pneumatically driven first arm attached to the first wedges;
removing fuel cell electrolyte from the interconnects;
removing metal contacts from the interconnects;
removing seal material from the interconnects; and
removing a coating from the interconnects.

11. The method of claim 10, wherein the singulating further comprises separating the interconnects by inserting second wedges into air channel openings exposed on an opposing second side of the stack, using a hydraulically or pneumatically driven second arm attached to the second wedges.

12. The method of claim 10, wherein the removing the metal contacts comprises using a pin array, ultrasonic waves, or grit blasting to remove the metal contacts.

13. The method of claim 10, wherein the removing of the seal material comprises using laser radiation to remove the seal material.

14. The method of claim 10, wherein the removing the coating comprises using grit blasting to remove the coating.

15. The method of claim 1, wherein the splitting apparatus further comprises:
a second arm connected to the main body and configured to move with respect to the main body; and
second wedges attached to the second arm and configured to be inserted into the stack and separate components of the stack,
wherein the first and second arms are disposed on opposing sides of the stack, and
wherein the method further comprises simultaneously inserting the first and second wedges into the opposing sides of the stack, to singulate the stack.

16. The method of claim 15, wherein the first and second arms are hydraulically or pneumatically driven.

17. The method of claim 1, wherein the openings are openings of air channels of interconnects of the stack.

18. The method of claim 1, wherein the aligning comprises moving the alignment plate relative to the main body.

19. The method of claim 1, wherein the splitting apparatus further comprises a gripper to attach to the first wedges to the first arm.

* * * * *